United States Patent [19]
Hewitt

[11] 4,078,531
[45] Mar. 14, 1978

[54] EXHAUST TEMPERATURE MONITORING SYSTEM

[76] Inventor: John T. Hewitt, 1021 Camino Real, Redondo Beach, Calif. 90245

[21] Appl. No.: 737,435

[22] Filed: Nov. 1, 1976

Related U.S. Application Data

[63] Continuation-in-part of Ser. No. 580,323, May 23, 1975, Pat. No. 4,023,549.

[51] Int. Cl.² ............................................. F02B 77/08
[52] U.S. Cl. .......................... 123/198 D; 123/198 DB; 123/41.15; 73/137; 73/343.5; 323/75 H; 340/57
[58] Field of Search .... 123/198 D, 198 DB, 198 DC, 123/41.15, 102; 73/137, 343.5, 346; 323/75 H; 340/57

[56] References Cited

U.S. PATENT DOCUMENTS

| | | | |
|---|---|---|---|
| 2,359,767 | 10/1944 | Keinath | 73/137 |
| 3,401,274 | 9/1968 | Marsh | 123/102 X |
| 3,568,648 | 3/1971 | Cass | 123/41.15 |
| 3,599,049 | 8/1971 | Barnard | 123/198 D X |
| 3,602,207 | 8/1971 | Kilmer | 123/198 D X |
| 3,763,397 | 10/1973 | Lockers | 123/198 D X |
| 3,775,745 | 11/1973 | Kelley | 123/41.15 X |
| 3,817,104 | 6/1974 | Sapic | 323/75 H |
| 3,841,291 | 10/1974 | Ludewig et al. | 123/41.15 X |
| 3,851,469 | 12/1974 | Eichler et al. | 123/198 DB X |
| 3,895,283 | 7/1975 | Peterson | 323/75 H |

*Primary Examiner*—Charles J. Myhre
*Assistant Examiner*—Ira S. Lazarus
*Attorney, Agent, or Firm*—Fulwider, Patton, Rieber, Lee & Utecht

[57] ABSTRACT

An exhaust temperature monitoring unit is provided with a thermocouple connected in opposition to a reference signal across the differential inputs of an operational amplifier. Both the thermocouple and the reference signal are connected to a common ground which is isolated from the vehicle chassis. This provides a floating reference point which is insensitive to variations in ground potential and eddy current in the vehicle chassis. The operational amplifier drives an optical coupling unit which in turn controls various alarms and vehicle controls.

8 Claims, 3 Drawing Figures

EXHAUST TEMPERATURE MONITORING SYSTEM

This is a continuation in part of U.S. Pat. application Ser. No. 580,323, filed on May 23, 1975, now U.S. Pat. No. 4,023,549.

FIELD OF THE INVENTION

The present invention relates to engine exhaust temperature monitoring systems and, more particularly, to a selectively engaged alarm or control system which is connected to indicate instances of abnormal exhaust temperature.

DESCRIPTION OF THE PRIOR ART

Monitoring of the temperature of an exhaust manifold by means of various sensors is a well known technique. Typically, the exhaust temperature of an engine, and particularly a diesel engine, is increased by excessive use of fuel. Continued use of an engine at abnormally high temperatures drastically decreases the life of many engine components and results in a loss of engine efficiency.

In fleet operations, such as in a commercial trucking fleet, the extention of the useful life of a diesel engine is often a significant economic factor. It is, however, normally possible to drive a truck at a constant speed at various fuel mixture settings. Thus, an operator may have acquired improper habits and while still meeting schedules, the operator may be inadvertently overheating the engine. Since various employees assigned to any one truck in the fleet may have, acquired such improper driving habits, monitoring this critical parameter becomes important, both for maintenance purposes and for the purpose of re-training the employees. Since improper driving habits are not readily observable, continued monitoring or recording of this parameter could entail large costs both in the recording paper and in the subsequent inspection of travel records. Generally an engine is designed for a particular thermal balance and will operate optimally when maintained at that balanced state. It is thus only the instances of abnormal or non-optimal operation that are of interest to the owner.

In addition, while continued operation of the vehicle in excess of proper temperatures may indicate improper driving habits, this same data is indicative of many other engine malfunctions and is therefore significant in a program of preventive maintenance. Generally, sensing the operating temperatures within an engine is best accomplished by monitoring the exhaust temperature thereof. In prior art devices, and in this invention, the use of a thermocouple in the manifold as the monitoring instrument provides the most economic means of reading out temperature. Thermocouples, however, typically generate small signals and are subject to various influences, such as noise and drift. The most pronounced of these error inducing signals results from ground differentials or eddy currents within the chassis of the vehicle.

SUMMARY OF THE INVENTION

It is the general purpose and object of the present invention to provide an exhaust temperature monitoring system which selectively engages a recorder, sounds an alarm, or actuates a control during those times when an abnormal temperature is sensed.

Further objects of the invention are to provide an exhaust temperature monitoring system which utilizes a thermocouple in a circuit independent of vehicle ground. This in effect provides a floating ground with respect to a voltage reference signal which is employed in association with the thermocouple unit. This allows good thermal contact to be maintained by the thermocouple with the vehicle manifold, but without incurring the prior disadvantages of vehicle chassis eddy currents and potential variations.

Another object of the invention is to provide a thermocouple unit to which a plurality of alarm or control systems may be connected. By providing common access points at the leads of the thermocouple unit, one or a plurality of alarm and control units may be connected to a single thermocouple. Thus, a primary alarm may be actuated in response to an initial signal from the thermocouple, while a secondary alarm may be actuated when the thermocouple signal reaches an even greater level. For example, a visual indication may be provided when the vehicle is being operated at a slightly excessive temperature, while an audible alarm may be sounded when the temperature becomes exceedingly great. Alternatively, a secondary control rather than an alarm may be provided. In such an instance, an alarm would first indicate the fact that a predetermined temperature had been exceeded. If the vehicle operator took no corrective action and the temperature continued to rise, an automatic control might be activated to respond to the excessive temperature and provide a corrective adjustment, such as a reduction in fuel flow.

By providing common points of attachment to the thermocouple for the various alarm systems, a single thermocouple may be employed to actuate a number of responsive controls or alarms, each sensitive to different temperature levels. Briefly, these and other objects are accomplished with the present invention by inserting a thermocouple into the wall of an exhaust manifold in thermal contact with the manifold. The thermocouple has one electrical lead connected to a voltage ground in common with the ground of a reference voltage. That ground, however, is not common to the vehicle chassis but rather is a ground point isolated from the vehicle chassis. This ground may be thought of as a floating ground, since its absolute potential may vary above or below that of the vehicle chassis which serves as the principal ground connection throughout the vehicle.

To provide isolation from chassis ground, the regulated voltage signal source which serves as a voltage reference is driven from the same electrical connection that provides an input to the thermocouple. Both the regulated voltage source and the thermocouple are connected at the output of a D.C. to D.C. convertor, which in turn is driven by a voltage regulator powered by the vehicle battery. The regulated voltage source and the thermocouple output are connected in opposition to a differential summing amplifier. The regulated voltage source may be selected by means of a wiper connection to a potentiometer, which provides a variable voltage dividing network that may be adjusted in accordance with the desired operating manifold temperature. Thus, an output of the operational amplifier in a predetermined polarity determines that the thermocouple output has exceeded the reference voltage set by the variable voltage divider. This output is connected to an optical coupling unit which in turn provides an output signal to actuate a control or alarm.

One form of such a control might include a regulating signal to a valve which reduces the fuel supply to the engine. One form of such an alarm might be a visual alarm such as a lighted indicator, while another form of alarm might be an audio alarm, such as a buzzer or beeper.

DESCRIPTION OF THE SPECIFIC EMBODIMENTS

Figure 1:
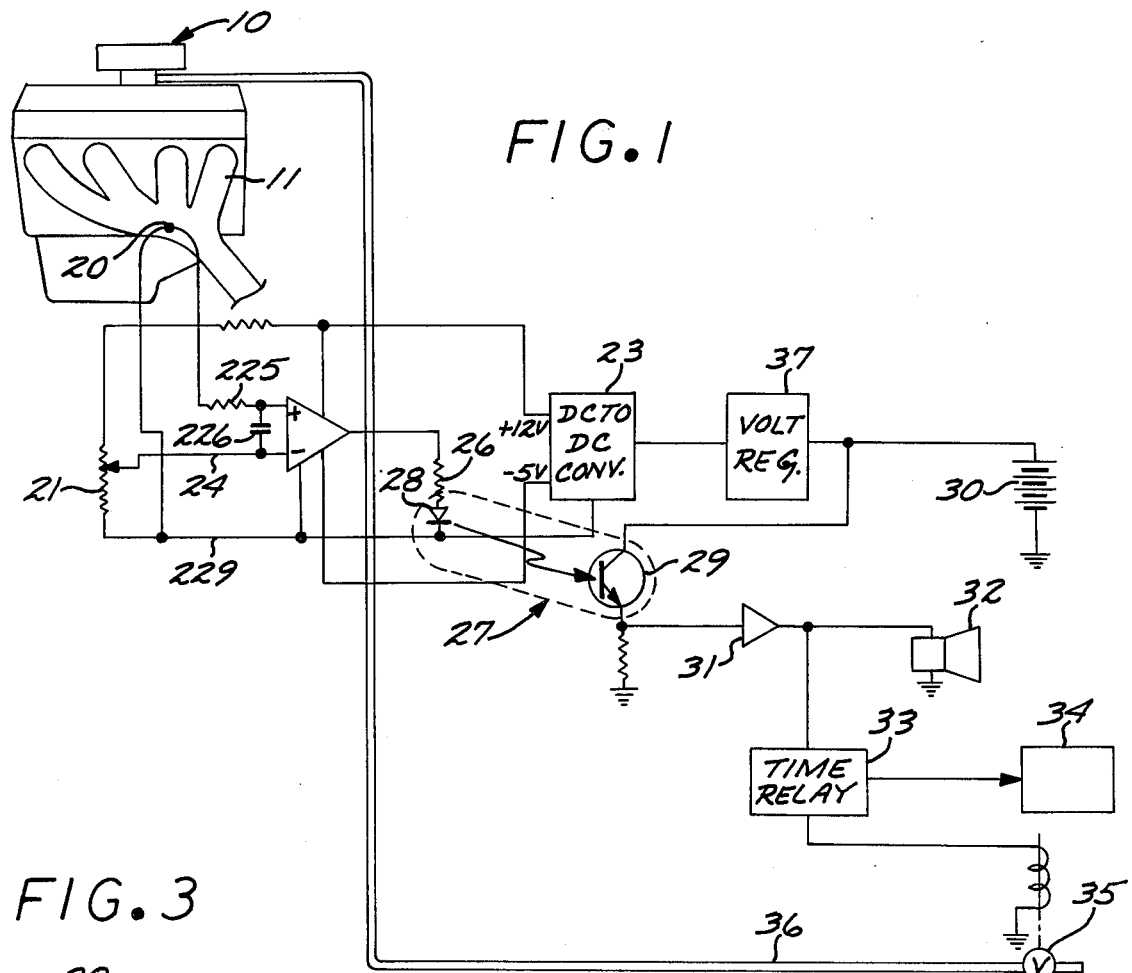
FIG. 1 is a block diagram illustrating one embodiment of the invention.

As shown in FIG. 1, a diesel engine 10 is provided with an exhaust manifold 11 according to conventional practice. A thermocouple 20 is installed within the wall of the exhaust manifold 11 in thermal contact therewith. One lead of the thermocouple 20 is connected to a common voltage ground indicated at 229, which serves as a common floating ground. The other electrical lead of the thermocouple 20 is connected as a signal input to a differential summing amplifier 22. The differential summing amplifier 22 is connected to receive power outputs at a positive 12 volts and at a negative 5 volts, as indicated at the D.C. to D.C. converter 23. The differential amplifier 22 also has a power connection to the common floating ground 229.

The D.C. to D.C. converter 23 is the secondary output of a voltage transformer 133, which has an input from the electrical system of the vehicle and ultimately from the vehicle battery 30. The inputs to the primary of the transformer 133 include a coupling to vehicle ground. In contrast, the outputs of the secondary of the transformer 133 are isolated from vehicle ground and include a common floating ground 229. The other outputs of the transformer 133 are at plus 12 and minus 5 volts. The potentiometer 21 is connected across these latter outputs. The potentiometer 21 has a wiper connection or voltage tap 24 which cooperates with the potentiometer 21 to provide a variable voltage divider. The connection 24 is tapped as an input to the differential amplifier 22 in opposing polarity with respect to the signal at the other input of the differential amplifier 22 from the thermocouple 20. A capacitor 122 is connected across the two input leads to the summing amplifier 22 to suppress the influence of brief sporadic voltage spikes, which are of no particular significance insofar as the steady state condition of the engine is concerned.

The amplifier 22 operates in a differential mode between saturation limits in response to the polarity of the signal difference between the two inputs. Thus, by balancing the inputs at the desired upper temperature limit, the additional signal developed at the junction of the thermocouple 20 can be set to swing the amplifier 22 from negative to positive saturation when the set temperature is exceeded.

At its output, amplifier 22 is connected across a limiting resistor 26 to a conventional optical coupling device 27. The optical coupling unit 27 includes a light emitting diode 28 connected between the resistor 26 and the common floating ground. The optical coupling device 27 also includes a phototransistor 29 connected in an emitter-follower circuit between the positive side of the vehicle battery 30 and the chassis ground, as distinguished from the floating ground 229.

Accordingly each time the temperature in manifold 11 exceeds the input balance to the amplifier 22, diode 28 will be biased in the forward conduction mode. Diode 28 thereupon lights up to render phototransistor 29 conductive. Quick response to manifold temperature is assured since direct thermocouple contact with the manifold can be achieved by virtue of this circuit arrangement.

When transistor 29 conducts, voltage across the emitter resistor 130 operates a driver stage 31 which is connected to an audio alarm 32 and, across a time delay circuit 33, to a recorder 34 and to a control valve 35. Valve 35 reduces the fuel flow within a fuel line 36 of the vehicle to prevent possible castrophic damage to engine 10.

The photosensitive transistor 29 includes a base to collector capacitive connection, including capacitor 129, and the emitter resistor 130, which is connected to ground. The collector of transistor 29 is connected to the battery 20 output at the cathode of diode 154. Thus, each time diode 28 lights up, transistor 29 is rendered conductive, with capacitor 129 stabilizing the operation thereof. When transistor 29 conducts a voltage is impressed across resistor 130. That voltage signal is connected across the input resistor 161 to the negative input terminal of an operational amplifier 160. Amplifier 160 includes a feedback resistor 162 and a ground referencing resistor 163 tying the positive terminal of amplifier 160 to ground. The output of amplifier 160 drives a complementary output stage, generally known as stage 170, through the resistor 165. The output transistor of stage 170 in turn controls the coil of the audio alarm 32 across a clamping circuit comprising diodes 171 and 172 connected again between battery 30 and ground.

The output of amplifier 160 is also connected across a diode 180 to one side of a capacitor 181 the other side of which is connected to ground. The ungrounded side of the capacitor 181 is also connected through an input resistor 182 to the positive input terminal of yet another operational amplifier 183 configured for unity gain by a negative feedback resistor 184. Amplifier 183 thereby serves the function of a buffer amplifier. Amplifier 183 in turn drives through an input resistor 185 the inverting input terminal of an operational amplifier 190 which includes a high frequency roll off negative feedback capacitor 191 and a positive resistive feedback 192. The positive input terminal to amplifier 190 receives, across an input resistor 193, a voltage developed at the division point of a resistive divider 195 connected again across battery 30 and ground. The combination of amplifiers 183 and 190 and capacitor 181 provides for fast charge-slow discharge output, which in turn controls a complementary stage 210 controlling a recorder 34 across a clamping circuit comprising diodes 211 and 212. Thus, the fast charge-slow discharge is accomodated to provide filtering of any exhaust temperature transients.

The output of amplifier 190 is connected across an input resistor 221 to the negative input terminal of an operational amplifier 220 which at the positive input terminal, across an input resistor 222, receives the battery signal. Amplifier 220, in a manner similar to the amplifier 190 and 160, controls yet another complementary stage 230 which, through a clamping circuit comprised of diodes 231 and 232, provides a signal to the control for valve 35 in the fuel line 36 which in turn provides a means for adjusting the parameter of vehicle fuel flow.

Figure 2:
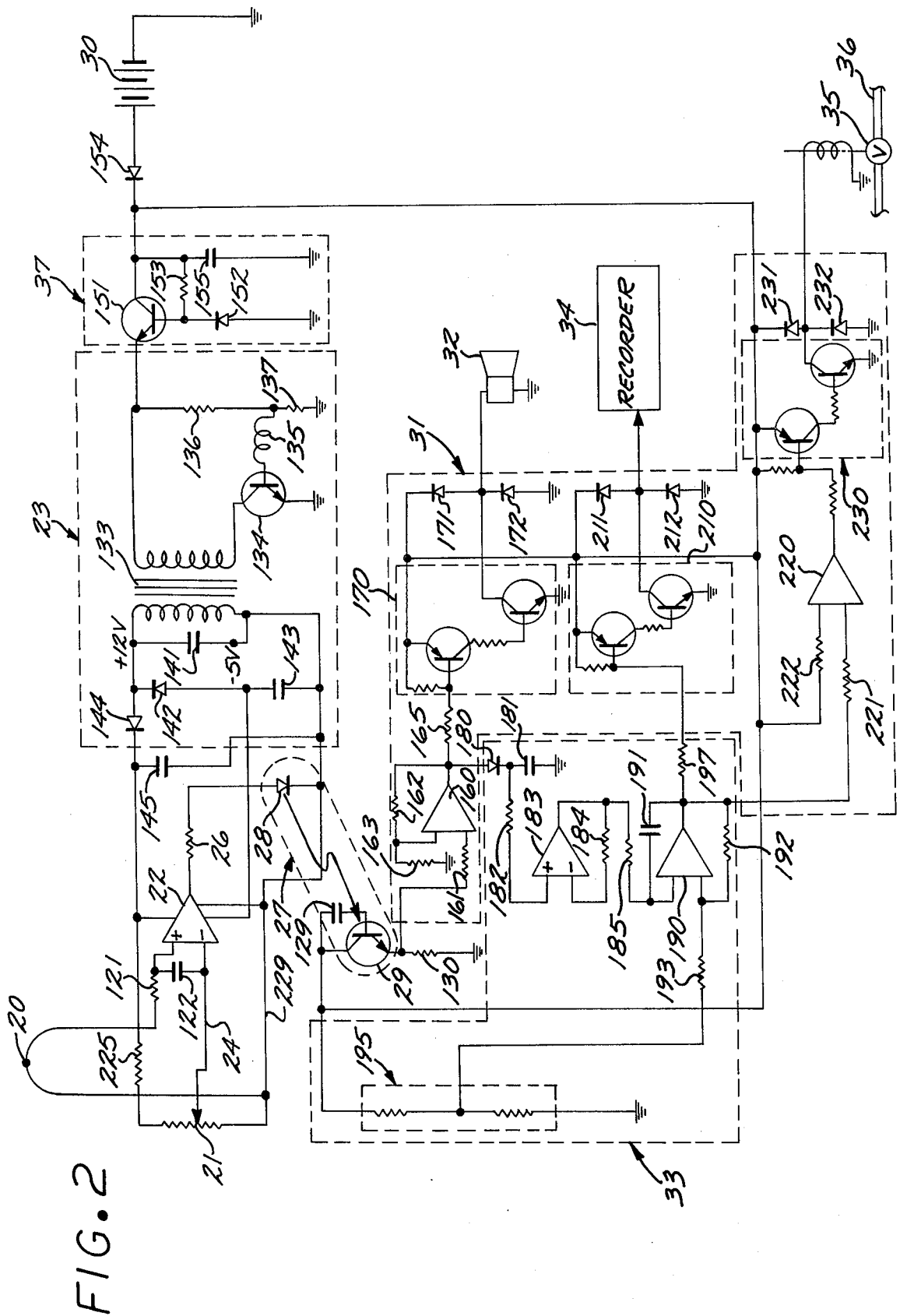
FIG. 2 is a circuit diagram illustrating the embodiment of FIG. 1 in detail.

As shown in FIG. 2 one lead from thermocouple 20 is connected to the floating ground 229. The other electrical lead from the thermocouple 20 is connected across an input resistor 121 to the positive input terminal of the differential operational amplifier 22. Thus, amplifier 22 is operating in a differential mode and the voltage tap 24 from the voltage dividing network formed in association with the potentiometer 21 is connected in opposition to the input from the thermocouple 20. The output of amplifier 22 is connected to the aforementioned optical coupling unit 27.

The detailed embodiment of the D.C. to D.C. convertor 23 is centered about a transformer 133 having the primary thereof connected in an oscillator circuit between the output of voltage regulator 37 and a transistor 134 connected in a common emitter mode to ground. Transistor 134 is controlled at the base by feedback winding 135 of transformer 133 which is connected at its other end to the division point of a voltage divider across a regulated output including an upper resistor 136 and a lower resistor 137.

The secondary of the transformer 133 sets the desired voltage ratio and further provides a capacitor 141 to obtain a peak resonance at the driving frequency from transistor 134 and transformer 133. This oscillating output across capacitor 141 is rectified by a diode 142 in series with a capacitor 143. The upper end of the secondary of transformer 133 is furthermore connected in forward bias across a diode 144 to the upper side of the potentiometer 21 through a current limiting resistor 225. Diode 142 ensures the proper polarity of voltage across the potentiometer 21 while a filtering capacitor 145 is connected between the cathode of diode 144 and the converter. Utilizing this circuit arrangement, a D.C. to D.C. converter 23 is formed wherein the regulated D.C. voltage is converted to a higher D.C. signal with the ground thereof referenced to one end of the secondary of the transformer 133.

The regulated voltage is developed at the voltage regulator 37 in a manner conventional in the art. More specifically, regulator 37 is shown as a series regulated voltage regulator wherein most of the regulation occurs in the collector-emitter path of transistor 151. Transistor 151 is referenced with respect to vehicle chassis ground at the base terminal thereof by a zener diode 152. The cathode of the zener diode 152 is connected across a base-collector resistor 153 to the cathode of a forward biased diode 154 in the positive circuit from the battery 30. To filter any noise at the collector of transistor 151, a capacitor 155 is connected to vehicle chassis ground therefrom. The cathode output of diode 154 provides a smooth and rectified battery voltage which is used as an unregulated power source for the various circuit elements described herein.

The particular arrangement of the thermocouple 20 is such that both of the electrical leads of the thermocouple 20 are accessible for multiple connection to a plurality of alarm indicators and vehicle function controls. For example, in addition to the configuration of FIG. 1 another specific embodiment illustrating an alternative practical example of the invention is shown in FIG. 3.

Figure 3:
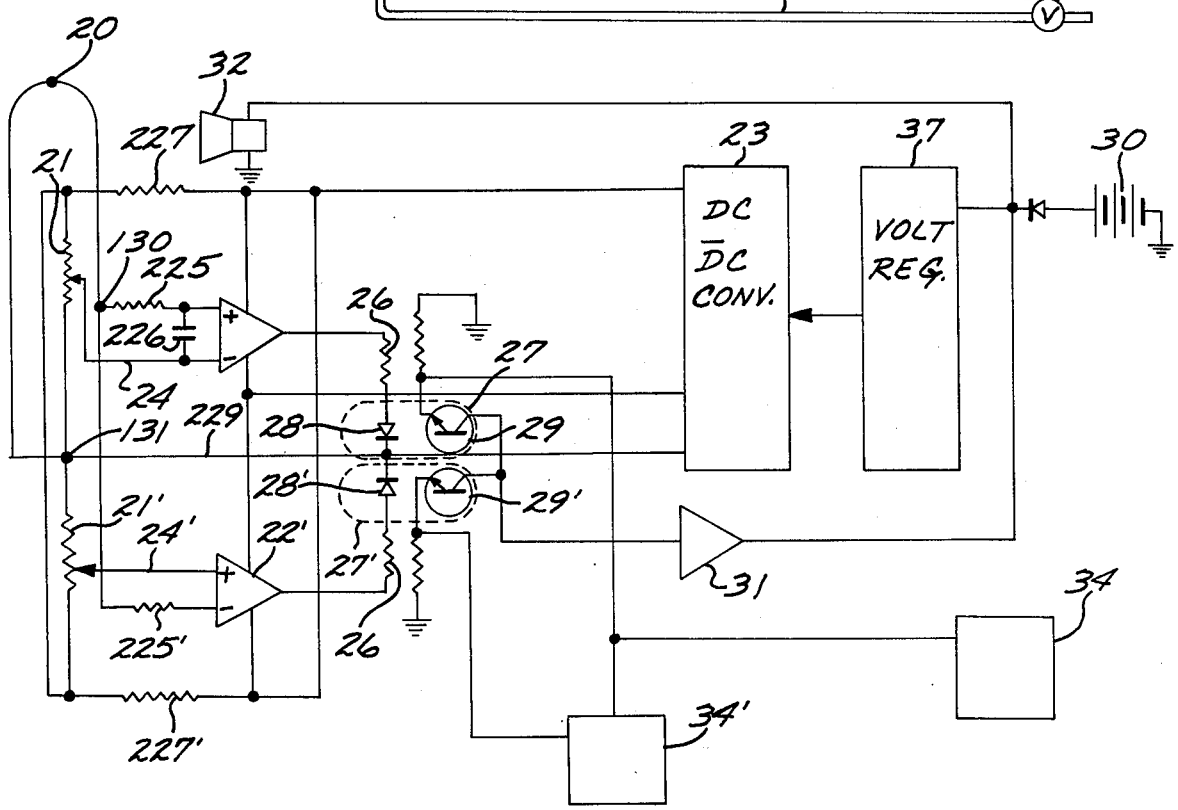
FIG. 3 is yet another circuit diagram illustrating a second detailed embodiment of the invention shown generally in FIG. 1.

The embodiment of FIG. 3 differs from that of FIG. 2 primarily in the provision of duplicate sets of variable voltage dividers 21 and 21', voltage taps 24 and 24', differential amplifiers 22 and 22' and optical couplings 27 and 27'. In the embodiment of FIG. 3 thermocouple 20 is connected to each of the variable voltage dividers 21 and 21' and to each of the differential amplifiers 22 and 22' at common connection points 131 and 130 respectively. As previously disclosed, diode 28 and its counterpart diode 28' are light emitting diodes and are forward biased by the output of amplifiers 22 and 22' to respectively emit light to the phototransistors 29 and 29'.

It is to be noted that in either embodiment the amplifier 22 operates in the manner of a LED driver. In the embodiment of FIG. 2, the amplifier 183, capacitor 181 and amplifier 190 provide the requisite operation of the delay circuitry described above and are designated as delay circuit 33.

Some of the many advantages of the present invention should now be readily apparent. The invention provides a temperature responsive system which is independent of vehicle chassis potential fluctuations and eddy currents, and which utilizes components that are reliable, easy to maintain and easy to adjust. In addition a single thermocouple is employed and is arranged for connection to a plurality of alarm and control circuits, each of which is responsive to the output of an optical coupling unit at a unique threshold actuation level.

It should be appreciated that various modifications and variations of the present invention may be made to the foregoing detailed embodiments described without departing from the scope of the invention claimed.

I claim:

1. An exhaust temperature monitoring system for use in a vehicle having an exhaust manifold comprising:

a voltage transformer having inputs from the electrical system of said vehicle including a coupling to vehicle ground and having an output lead isolated from vehicle ground and serving as a common floating ground and having other output leads carrying a power output and a voltage reference signal;

variable voltage dividing means connected to said output lead of said voltage transformer serving as said floating ground and to another output lead from said voltage transformer to receive said voltage reference signal and having a voltage tap therefrom;

differential summing amplifier means connected to receive said power output from said voltage transformer and having one signal input from said voltage tap of said variable voltage dividing means;

thermocouple means adapted for thermal contact with said manifold and having one electrical lead connected to said floating ground and having another electrical lead connected as a signal input to said differential summing amplifier means;

optical coupling means connected to receive the output of said differential summing amplifier means and to generate an output signal at a potential with respect to said floating ground; and alarm means operatively connected to said optical coupling means for producing an alarm responsive to the output of said optical coupling means.

2. The exhaust temperature monitoring system of claim 1 further characterized in that a plurality of variable voltage dividers, differential amplifiers, optical coupling means and alarm means are provided, and said thermocouple means is connected to said floating ground and to each of said differential amplifiers.

3. The exhaust temperature monitoring system of claim 1 further characterized in that a plurality of alarm means are provided each connected to the aforesaid optical coupling means and each responsive to the output of said optical coupling means at a unique threshold.

4. The exhaust temperature monitoring system of claim 1 wherein said differential summing amplifier means is an operational amplifier.

5. The exhaust temperature monitoring system of claim 1 wherein said alarm means is an audible alarm mechanism.

6. The exhaust temperature monitoring system of claim 1 wherein a delay means is interposed between the output of said optical coupling means and said alarm means.

7. An exhaust temperature monitoring system for use in a vehicle employing an internal combustion engine and having an exhaust manifold comprising;
 a voltage transformer having inputs from the electrical system of said vehicle including a coupling to vehicle ground and having an output lead isolated from vehicle ground and serving as a common floating ground and having other output leads carrying a power output and a voltage reference signal,
 variable voltage dividing means connected to said floating ground and connected to receive said voltage reference signal and having a voltage tap therefrom,
 differential summing amplifier means connected to receive said power output from said voltage transformer and having one signal input from said voltage tap of said variable voltage dividing means;
 thermocouple means adapted for thermal contact with said manifold and having one electrical lead connected to said common voltage ground and having another electrical lead connected as a signal input to said differential summing amplifier means;
 optical coupling means connected to receive the output of said differential summing amplifier means and to generate an output signal at a potential with respect to said floating ground; and
 control means operatively connected to said optical coupling means for adjusting operating parameters of said vehicle.

8. The exhaust temperature monitoring system of claim 7 wherein said control means regulates fuel flow to the internal combustion engine of the vehicle.

* * * * *